July 9, 1963

G. E. SMITH, JR 3,096,892

AUTOMATIC TAIL GATE RELEASE

Filed Aug. 15, 1960

INVENTOR.
George E. Smith Jr.
BY
Sam J. Slotsky
ATTORNEY

United States Patent Office 3,096,892
Patented July 9, 1963

3,096,892
AUTOMATIC TAIL GATE RELEASE
George E. Smith, Jr., Moville, Iowa
Filed Aug. 15, 1960, Ser. No. 49,778
1 Claim. (Cl. 214—83.18)

My invention relates to an automatic tail gate release.

An object of my invention is to provide a tail gate having certain latching features whereby the tail gate will be automatically released when the conveyor at the bottom of a wagon box is started.

A further object of my invention is to provide a release which is automatic in that it re-sets itself after it is swung to outer position.

With these and other objects in view, my invention consists in the construction, arrangement, and combination of the various parts of my device, whereby the objects contemplated are attained as hereinafter more fully set forth, pointed out in my claim, and illustrated in the accompanying drawings, in which:

Figure 1:
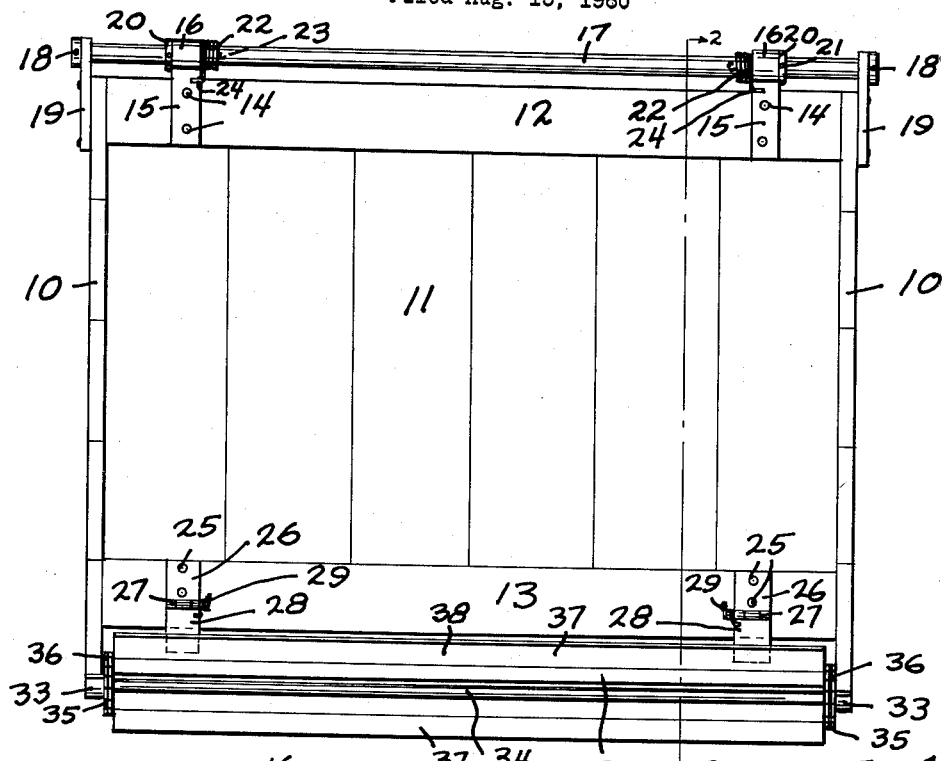
FIGURE 1 is a rear view of my device as attached to a wagon tail gate.

My invention contemplates the provision of an automatic release for tail gates which functions automatically in that no attention is required by the operator since the device will automatically allow the tail gate to be opened and will automatically lock the tail gate in lower locked position.

I have used the character 10 to designate the side walls of a wagon, the character 11 indicating the tail gate or rear wall, and attached across the tail gate 11 are the transverse boards 12 and 13.

Attached as at 14 to the upper tail gate structure are the pair of straps 15 which are attached to the cylindrical bearings 16, and received within the bearings 16 is the transverse rod 17, the rod 17 being attached as at 18 to the vertically positioned straps 19, which are attached to the side walls 10.

The character 20 indicates collars attached at 21 to the transverse rod 17, and the character 22 indicates a pair of torsion springs which are suitably attached at 23 to the rod 17, portions of the torsion springs bearing at 24 against the straps 15.

Attached at 25 to the transverse board 13 are a pair of straps 26 which are hinged at 27 to the further downwardly projecting strap portions 28, the further torsion springs 29 serving to normally maintain engagement of the portions 28 with the board 13.

Attached at 30 (see FIGURE 2) to the lower end of the tail gate is a resilient strip 31 which bears against the floor 32 of the wagon box. The character 33 indicates a pair of bearings suitably secured to the bottom of the wagon box, and journalled in the bearings 33 is a transverse shaft 34 to which are attached the pair of sprockets 35 at either side of the box, the sprockets 35 engaging the endless sprocket chain 36 to which sprocket chain 36 are attached the usual transverse paddles or slats 37 which as in usual practice are provided for conveying the material in the wagon rearwardly and outwardly through the tail gate.

Figure 2:
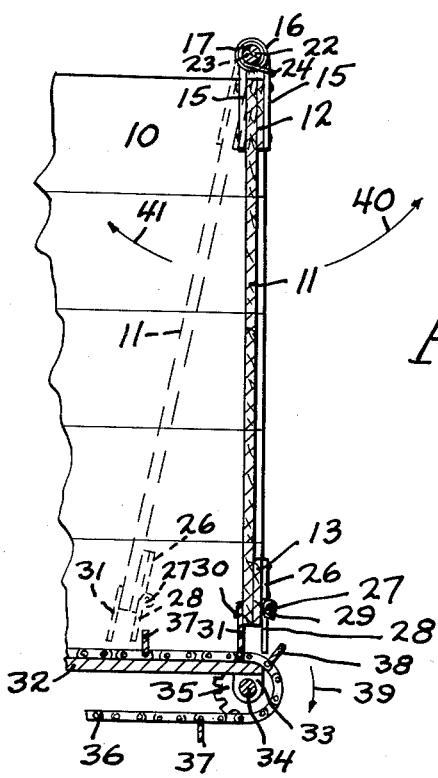
FIGURE 2 is a sectional view of FIGURE 1 taken along the lines 2—2 thereof.

The device operates in the following manner. As shown in FIGURES 1 and 2, one of the paddles or slats, which will be indicated by the character 38, occupies the position outside of the gate 11 as shown, and in this position it will be noted that the lower portions 28 of the hinged structure will bear against this slat 38 so that in this manner when the wagon is filled with material, the gate 11 will be locked against opening, or in other words, the material can be filled into the wagon with the tail gate being in its closed and locked position.

However, as soon as the endless sprocket chains 36 are started to discharge the material, the slat 38 will pass in the direction of the arrow 39, whereby the members 28 will clear the slat 38 when the tail gate swings in the direction of the arrow 40, which this tail gate will do as the material is thus conveyed out of the wagon box, since the pressure of the material against the tail gate will allow it to open.

The torsion springs 22 are adjusted in such a manner as to cause the tail gate 11 to swing to the dotted position after discharge of the material, thereby providing means for locking the lower end of the tail gate regardless of where the transverse slat 37 may be positioned. The tail gate 11 will swing in the direction 41 after the box is emptied and whereby in swinging in this direction the locking members 28 will pivot until they clear the slat 37 and will then occupy the dotted position shown, whereby when material is again filled into the wagon box, the door 11 will be in this position, and yet will be locked against outward movement.

By means of this structure the tail gate will be automatically locked regardless of the position of any of the conveying slats 37.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A swinging tail gate construction comprising a tail gate, means for pivoting the upper edge of said tail gate to a wagon, a pair of extending members attached at the lower end of said tail gate, an endless conveyor positioned at the bottom of said wagon, said conveyor including transverse conveying slats, said extending members including straps having lower hinged portions, said lower hinged portions adapted to engage any one of said slats to prevent said tail gate from opening outwardly when said conveyor is stationary, spring urged means attached to said tail gate for positioning said hinged portions behind one of said slats when said slat is spaced inwardly from the rear of said wagon, the lower edge of said tail gate being adapted to clear said slats, a resilient flap attached adjacently to said lower edge and adapted to engage the floor of said wagon.

References Cited in the file of this patent

UNITED STATES PATENTS

| | | |
|---|---|---|
| 2,345,328 | Conway et al. | Mar. 28, 1944 |
| 2,462,404 | Kahres et al. | Feb. 22, 1949 |
| 2,475,590 | Carbert | July 12, 1949 |
| 2,837,228 | Kaster | June 3, 1958 |